US011869455B2

(12) United States Patent
Pieri et al.

(10) Patent No.: US 11,869,455 B2
(45) Date of Patent: Jan. 9, 2024

(54) SYSTEMS AND METHODS FOR AMBIENT LIGHT COMPENSATION USING PQ SHIFT

(71) Applicant: Dolby Laboratories Licensing Corporation, San Francisco, CA (US)

(72) Inventors: Elizabeth G. Pieri, Campbell, CA (US); Jaclyn Anne Pytlarz, Santa Clara, CA (US); Jake William Zuena, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/010,306

(22) PCT Filed: Jun. 30, 2021

(86) PCT No.: PCT/US2021/039907
§ 371 (c)(1),
(2) Date: Dec. 14, 2022

(87) PCT Pub. No.: WO2022/006281
PCT Pub. Date: Jan. 6, 2022

(65) Prior Publication Data

US 2023/0282182 A1 Sep. 7, 2023

Related U.S. Application Data

(60) Provisional application No. 63/046,015, filed on Jun. 30, 2020.

(30) Foreign Application Priority Data

Jun. 30, 2020 (EP) .................................... 20183195

(51) Int. Cl.
*G09G 5/10* (2006.01)

(52) U.S. Cl.
CPC ......... *G09G 5/10* (2013.01); *G09G 2360/144* (2013.01); *G09G 2360/16* (2013.01)

(58) Field of Classification Search
CPC ........................................................ G09G 5/10
See application file for complete search history.

(56) References Cited

U.S. PATENT DOCUMENTS 8,593,480 B1 11/2013 Ballestad
10,140,953 B2 * 11/2018 Wanat ..................... G09G 5/10
(Continued)

FOREIGN PATENT DOCUMENTS

WO 2018119161 A1 6/2018
WO 2019245876 A1 12/2019
WO 2020146655 A1 7/2020

OTHER PUBLICATIONS

ITU-R BT.2100-2 "Image Parameter Values for High Dynamic Range Television for Use in Production and International Programme Exchange" Jul. 2018.
(Continued)

*Primary Examiner* — Chun-Nan Lin

(57) ABSTRACT

Novel methods and systems for compensating for ambient light around displays are disclosed. A shift in the PQ curve applied to an image can compensate for sub-optimal ambient light conditions for a display, with the PQ shift being either an addition to a compensation value in PQ space followed by a subtraction of the compensation value in linear space, or an addition to the compensation value in linear space followed by a subtraction of the compensation value in PQ space. Further adjustments to the PQ curve can also be made to provide an improved image quality with respect to image luminance.

19 Claims, 7 Drawing Sheets

(56) References Cited

U.S. PATENT DOCUMENTS

| | | | | |
|---|---|---|---|---|
| 10,600,166 | B2 | 3/2020 | Pytlarz | |
| 2017/0116931 | A1* | 4/2017 | Matsui | G09G 3/36 |
| 2017/0116963 | A1* | 4/2017 | Wanat | G06T 5/009 |
| 2018/0041759 | A1* | 2/2018 | Froehlich | H04N 19/182 |
| 2018/0115774 | A1* | 4/2018 | Su | H04N 19/98 |
| 2019/0304379 | A1 | 10/2019 | Pytlarz | |
| 2019/0362476 | A1 | 11/2019 | Pytlarz | |

OTHER PUBLICATIONS

ITU-R Radiocommunication Sector of ITU, Recommendation ITU-R BT.1886 "Reference Electro-Optical Transfer Function for Flat Panel Displays Used in HDTV Studio Production" Mar. 2011, pp. 1-7.
SMPTE ST 2084:2014 "High Dynamic Range Electro-Optical Transfer Function of Mastering Reference Displays".

* cited by examiner

SYSTEMS AND METHODS FOR AMBIENT LIGHT COMPENSATION USING PQ SHIFT

CROSS-REFERENCE TO RELATED APPLICATIONS

This application is the U.S. national stage entry of International Patent Application No. PCT/US2021/039907, filed Jun. 30, 2021, which claims priority of U.S. Provisional Patent Application No. 63/046,015, filed Jun. 30, 2020, and European Patent Application No. 20183195.5, filed Jun. 30, 2020, both of which are incorporated herein by reference in their entirety.

TECHNICAL FIELD

The present disclosure relates to improvements for the processing of video signals. In particular, this disclosure relates to processing video signals to improve display in different ambient light situations.

BACKGROUND

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (03/2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits. Commercial smartphones typically range from 200 to 600 nits. These different display luminance levels present challenges when trying to display an image under different ambient lighting scenarios, as shown in FIG. 1. The viewer 110 is viewing an image (e.g. video) on a screen 120. The image luminance 130 can be "washed out" by the ambient light 140. The ambient light 140 luminance levels can be measured by a sensor 150 in, on, or near the display. The luminance of the ambient light can vary, for example, from 5 nits in a dark room to 200 nits in a well-lit room without daylight, or to 400 nits in a room with indirect sunlight, to 600+ nits outdoors. One solution was to make a linear adjustment to the brightness controls of the display, but that can result in a brightness imbalance of the display.

SUMMARY

Various video processing systems and methods are disclosed herein. Some such systems and methods may involve compensating an image to maintain its appearance with a change in the ambient surround luminance level. A method may be computer-implemented in some embodiments. For example, the method may be implemented, at least in part, via a control system comprising one or more processors and one or more non-transitory storage media.

In some examples, a system and method for modifying an image to compensate for ambient light conditions around a display device is described, including determining the PQ curve of the image; determining a PQ shift for the PQ curve based on a compensation value determined from the ambient light conditions and the image, the PQ shift consisting of either: an addition to the compensation value in PQ space followed by a subtraction of the compensation value in linear space, or an addition to the compensation value in linear space followed by a subtraction of the compensation value in PQ space; applying the PQ shift to the PQ curve, producing a shifted PQ curve; and modifying the image with the shifted PQ curve.

In some such examples, the method may involve applying a tone map to the image prior to modifying the image. In some such examples, the method may be performed by software, firmware or hardware, and may be part of a video decoder.

Some or all of the methods described herein may be performed by one or more devices according to instructions (e.g. software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure may be implemented in a non-transitory medium having software stored thereon. The software may, for example, be executable by one or more components of a control system such as those disclosed herein. The software may, for example, include instructions for performing one or more of the methods disclosed herein.

At least some aspects of the present disclosure may be implemented via an apparatus or apparatuses. For example, one or more devices may be configured for performing, at least in part, the methods disclosed herein. In some implementations, an apparatus may include an interface system and a control system. The interface system may include one or more network interfaces, one or more interfaces between the control system and memory system, one or more interfaces between the control system and another device and/or one or more external device interfaces. The control system may include at least one of a general-purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to one or more processors.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements, but different reference numbers do not necessarily designate different elements between different drawings.

DETAILED DESCRIPTION

The term "PQ" as used herein refers to perceptual luminance amplitude quantization. The human visual system responds to increasing light levels in a very non-linear way. The term "PQ space", as used herein, refers to a non-linear mapping of linear luminance amplitudes to non-linear, PQ luminance amplitudes, as described in Rec. BT. 2100. A human's ability to see a stimulus is affected by the luminance of that stimulus, the size of the stimulus, the spatial frequencies making up the stimulus, and the luminance level that the eyes have adapted to at the particular moment one is viewing the stimulus. In an example, a perceptual quantizer function maps linear input gray levels to output gray levels that better match the contrast sensitivity thresholds in the human visual system. An examples of PQ mapping functions (or EOTFs) is described in SMPTE ST 2084:2014 "High Dynamic Range EOTF of Mastering Reference Displays," where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

Figure 1:
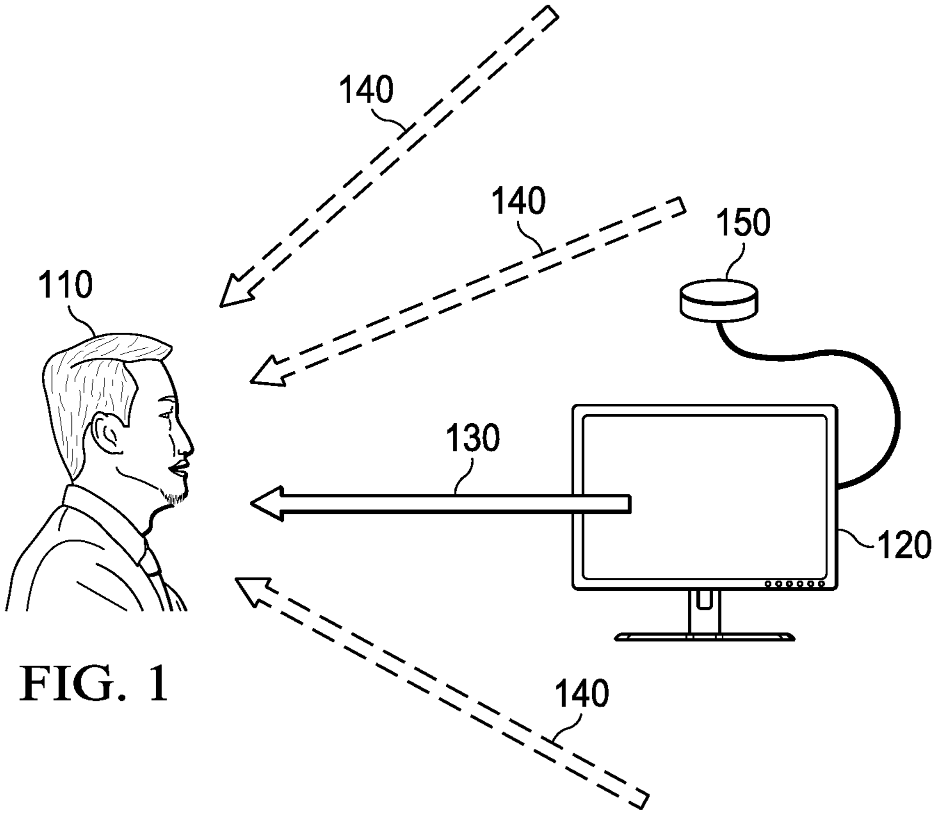
FIG. 1 illustrates an example of ambient light for a display.
Figure 2:
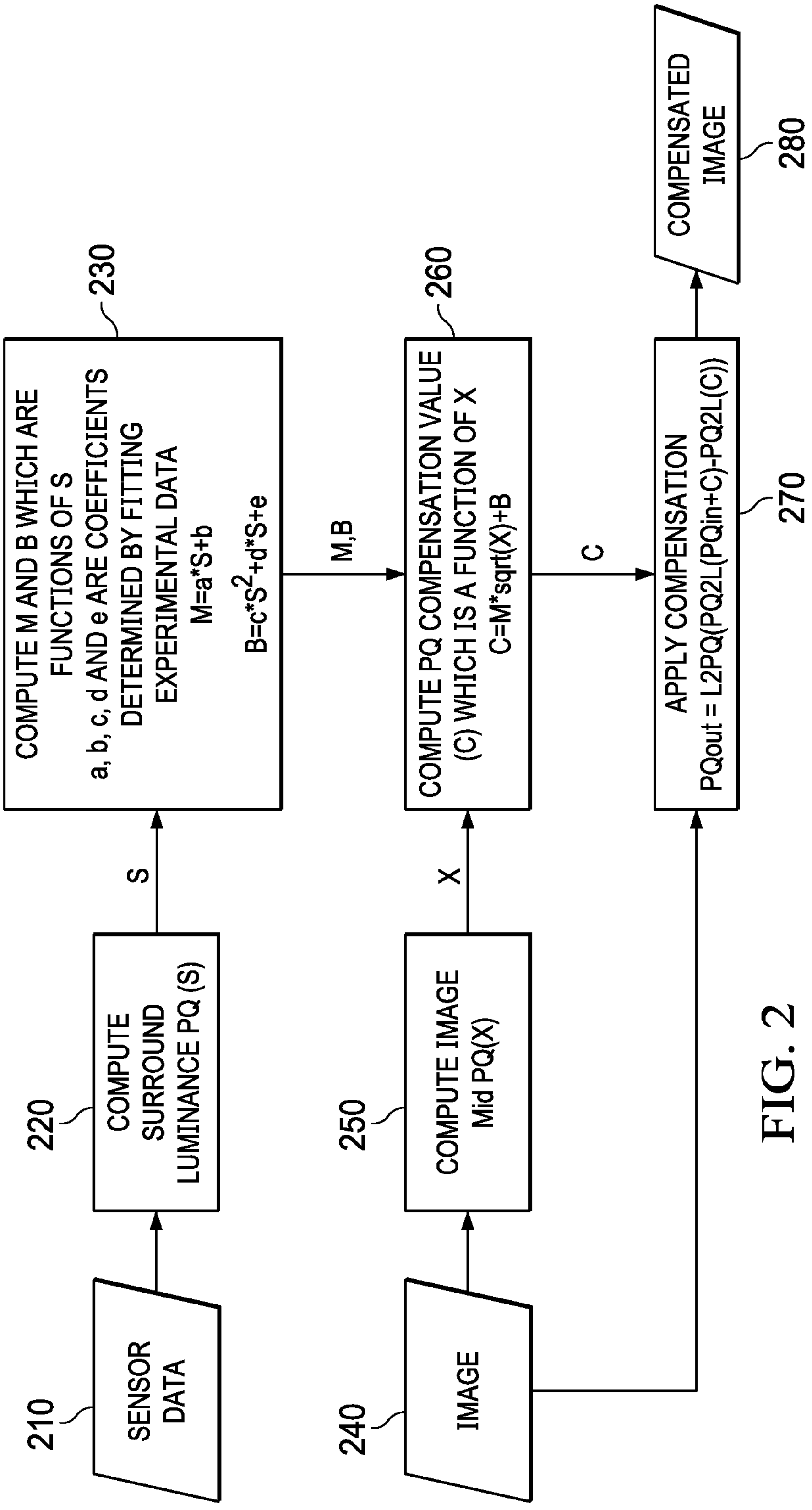
FIG. 2 illustrates an example flowchart for a method to compensate for ambient light around a display.

A solution to the problem of adjusting the luminance of a display to accommodate ambient lighting conditions is described herein by applying compensation to the image as a shift in the PQ. FIG. 2 shows an example method for applying the compensation to an image on a display.

Sensor data 210 is taken of the area surrounding the display to produce data of luminance measurements of the ambient light. The sensor data can be taken from one or more luminance sensors, the sensor comprising photo-sensitive elements, such as photoresistors, photodiodes, and phototransistors. This sensor data is then used to compute surround luminance PQ 220, which can be designated S. This computation, as with all computations described herein, can be performed local to the display, such as on a processor or computer in or connected to the display, or it can be performed on a remote device or server that delivers the image to the device.

Given the surround luminance PQ S, two intermediate values (M and B, herein) can be computed as a function of S. In an example, M and B are computed from the following equations:

$$M=a*S+b \quad \text{eq. 1}$$

$$B=c*S^2+d*S+e \quad \text{eq. 2}$$

where a, b, c, d, and e are constants. In this example, M is a linear function of S, while B is a quadratic function of S. The constants can be determined experimentally as shown herein.

The image 240 can be analyzed for the range of luminance it contains (e.g. luma values). The image can be a frame of video. The image can be a key frame of a video stream. From these luminance data, a mid PQ can be determined 250 from the complete image. The mid PQ may represent an average luminance of the image. An example of calculating the mid PQ is taking the average of the max values of each component (e.g. R, G, and B) of the down-sampled image. Another example of calculating the mid PQ is averaging the Y values of an image in the $YC_BC_R$ color space. This mid PQ value can be designated as X. The mid PQ, minimum, and maximum values can be computed on the encoder side and provided in the metadata, or they can be computed on the decoder side.

From the computed M and B values 230 and the computed X value 250 a compensation value can be computed 260. This compensation value can be designated as C and calculated from the equation:

$$C=M\sqrt{X}+B \quad \text{eq. 3}$$

The square root of X is used in this example because it allows a linear relationship for the experimental data. Computing C from X can be done, but it would produce a more complicated function. Keeping the function linear allows for easier computation, particularly if it is implemented in hardware rather than software.

The compensation value C can then be used in step 270 to modify the image by a PQ shifted PQ curve. The PQ shift can be expressed by the equation:

$$PQ_{out}=L2PQ(PQ2L(PQ_{in}+C)-PQ2L(C)) \quad \text{eq. 4}$$

where $PQ_{out}$ is the resulting PQ after the shift, $PQ_{in}$ is the original PQ value, L2PQ( ) is a function that converts from linear space to PQ space, PQ2L( ) is a function that converts from PQ space to linear space, and C is the compensation value (for the given values of X of the image in question and M and B for the measured ambient light). Conversions between linear space and PQ space are known in the art, e.g., as described in ITU-R BT.2100, "Image parameter values for high dynamic range television for use in production and international programme exchange." Therefore, equation 4 represents an addition in PQ space and a subtraction in linear space. The compensated (modified) image 280 is then presented on the display. The compensation can occur after tone mapping in a chroma separated space, such as $IC_TC_P$, $YC_BC_R$, etc. The processing can be done on the luma (e.g. I) component, but chromatic adjustments might also be useful to maintain the intent of the content. The compensation can also occur after tone mapping in other color spaces, like RGB, where the compensation is applied to each channel separately.

This method provides a compensation to an image such that in a high ambient surround luminance environment (e.g. outside in sunlight) it matches the appearance it would have in an ideal surround environment (e.g. a very dark room). An example of an ideal surround environment target is 5 nits (cd/m$^2$). The dark detail contrast is increased to ensure that details remain visible. This method provides a compensation to an image such for an ambient surround luminance environment being brighter than a reference value. The reference value may be specific value or a range of values.

In another embodiment, the compensation is reversed to allow compensation for ambient lighting conditions that are darker than the ideal. Such compensation is for an ambient surround luminance environment being darker than the reference value. For example, if an image is originally intended to be viewed in a brightly lit room, the compensation can be set such that it has the correct appearance in a dark room. For this embodiment, the operations are reversed, having an addition in linear space and a subtraction in PQ space, as shown in the following equation:

$$PQ_{out}=L2PQ(PQ2L(PQ_{in})+PQ2L(C))-C \quad \text{eq. 5}$$

Figure 3:
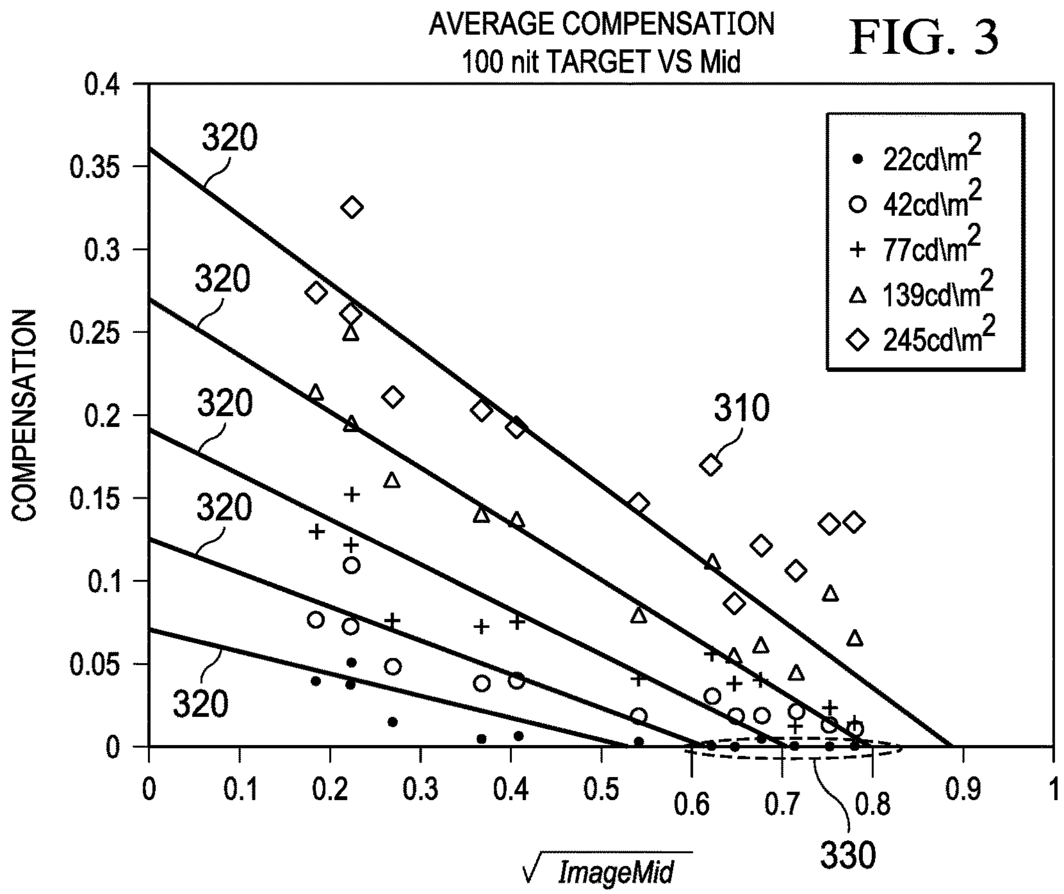
FIG. 3 illustrates an example graph of experimental data for the square root of the image mid PQ vs. a compensation value at different ambient light conditions.

In an embodiment, the compensation value C is determined experimentally by determining, subjectively, compensation values for various image illumination values under different ambient light conditions. An example would be to obtain data through a psychovisual experiment in which observers subjectively chose the appropriate amount of compensation for various images in different surround luminance levels. An example of this type of data is shown in FIG. 3. The graph shows data points 310 of the square root of image mid PQ values plotted against the subjectively chosen compensation values for five different ambient light conditions (in this case, 22, 42, 77, 139, and 245 nits; ranging from a dark room to well-lit conditions). From these points 310, trend lines 320 can be fitted for data points for each ambient light condition. Since the square roots of the image mid values are used, it is easier to fit these points with linear regression. Images with bright PQ midpoints in dark ambient conditions will have data points 330 bottoming out at zero compensation. Those points would skew the trend line incorrectly, so they are not considered for the fit.

From these lines 320, two useful values can be determined: the slope of the line, ΔCompensation/Δsqrt(ImageMid), and the y-intercept, the value of Compensation at sqrt(ImageMid)=0, where sqrt(x) denotes the square root of x, e.g., $\sqrt{x}$). These slopes and y-intercepts can then also be fitted to further functions, as shown in FIG. 4 and FIG. 5.

Figure 4:
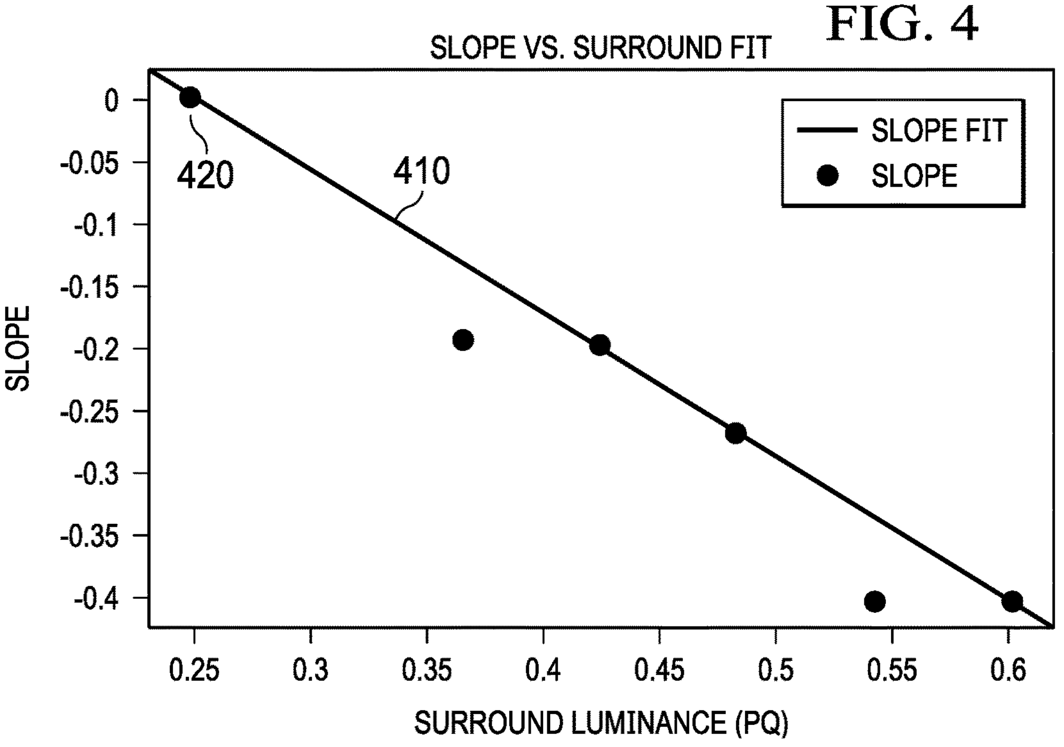
FIG. 4 illustrates an example graph of a fitted line for surround luminance PQ vs. the slope of experimental data.

FIG. 4 shows an example of fitting a line 410 (linear regression) to the slopes of the Compensation vs. sqrt (ImageMid) lines (e.g. as shown in FIG. 3) vs. the surround (ambient) luminance PQ. In some embodiments, an extra data point 420 is added for the fitting, such that the slope and surround luminance PQ results in 0 compensation for a reference (ideal) surround luminance. From this fitting, the function of M in terms of the surround luminance S can be found for use in equation 1 (see FIG. 2). This allows for the computation of compensation values a and b for equation 1 (a being the slope of this fitting line, b being the y-intercept of this fitting line). These values can then be put in equation 1 with a measured S surround luminance to determine the M value for that surround luminance (e.g. 5 nits).

Figure 5:
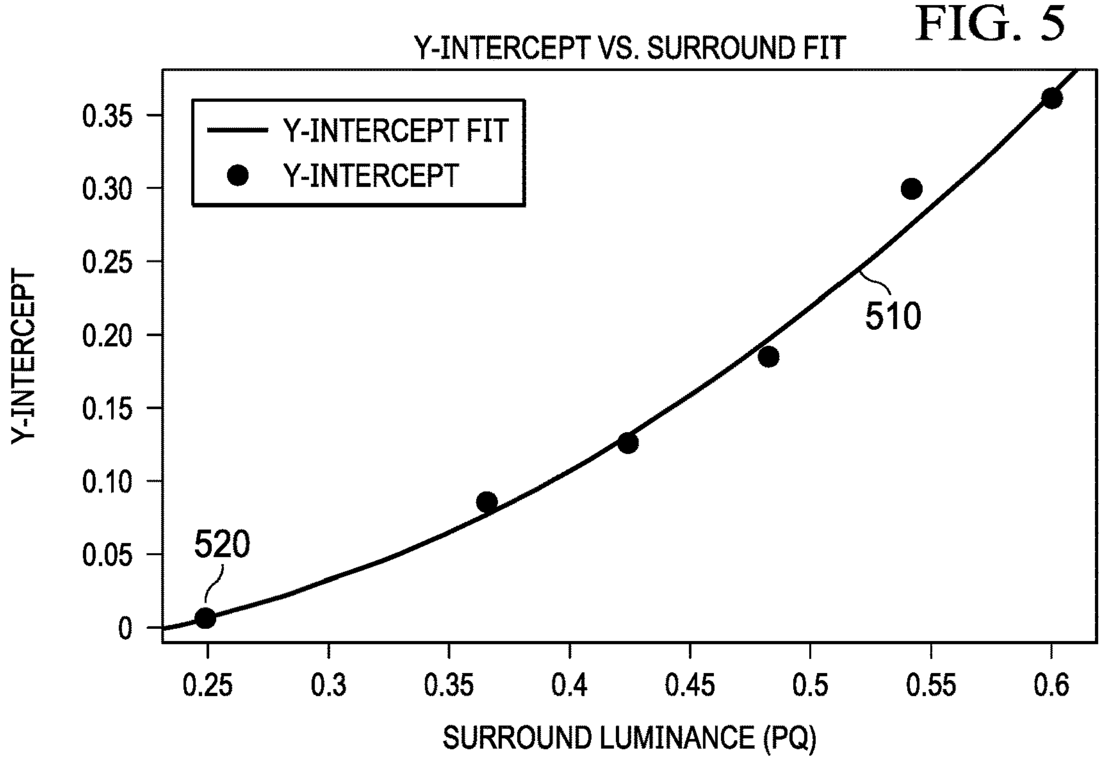
FIG. 5 illustrates an example graph of a fitted line for surround luminance PQ vs. the y-intercept of experimental data.

FIG. 5 shows an example of fitting a curve 510 (second degree polynomial) to the y-intercepts of the Compensation vs. sqrt(ImageMid) lines (e.g. as shown in FIG. 3) vs. the surround (ambient) luminance PQ. In some embodiments, an extra data point 520 is added for the fitting, such that the y-intercept and surround luminance PQ results in zero compensation for a reference (ideal) surround luminance.

Figure 6:
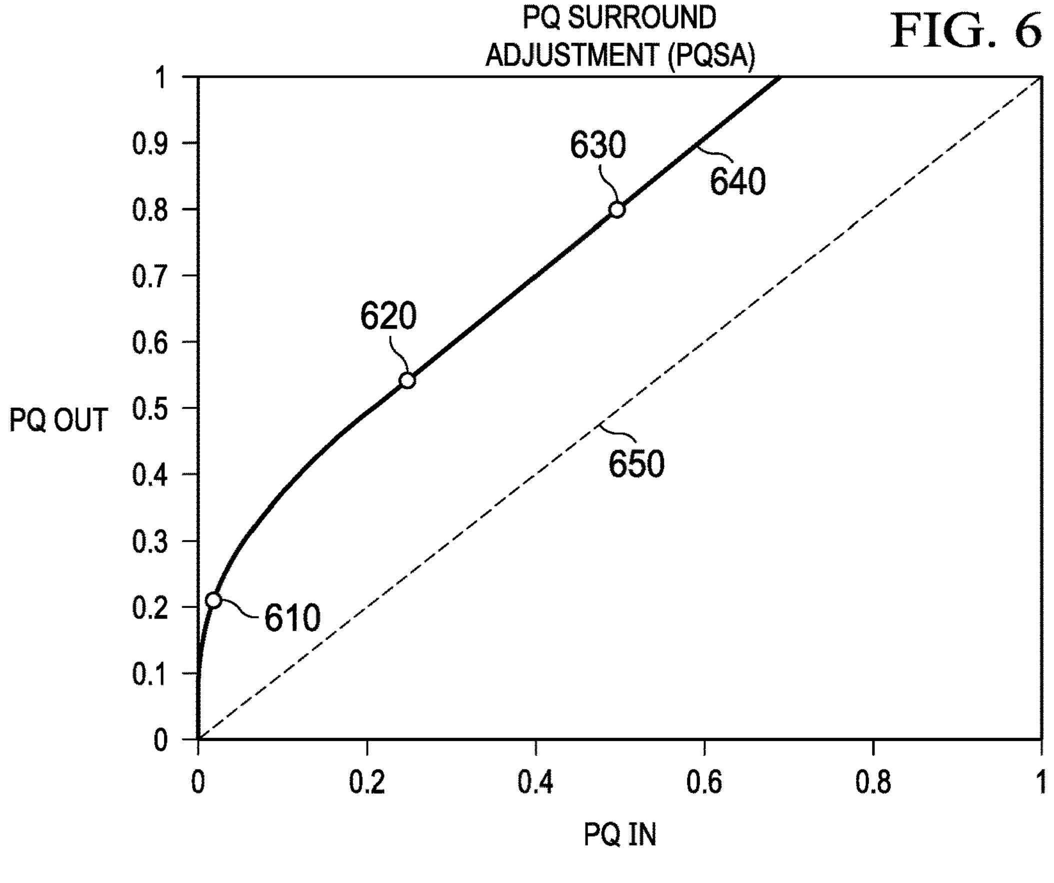
FIG. 6 illustrates an example PQ shift compensation curve.

FIG. 6 shows an example PQ shift (PQ Surround Adjustment) as produced by equation 4. The three black circles represent the minimum 610, midpoint 620, and maximum 630 of the image after tone mapping has occurred. The solid line 640 is the adjustment using the PQ shift method with a compensation value of 0.3 (calculated from equation 4). The dashed line 650 represents values with no compensation. The minimum 610 of the image is located at approximately [0.01, 0.21]. The image does not contain content below this level, so in this example the image might be over-brightened.

Figure 7:
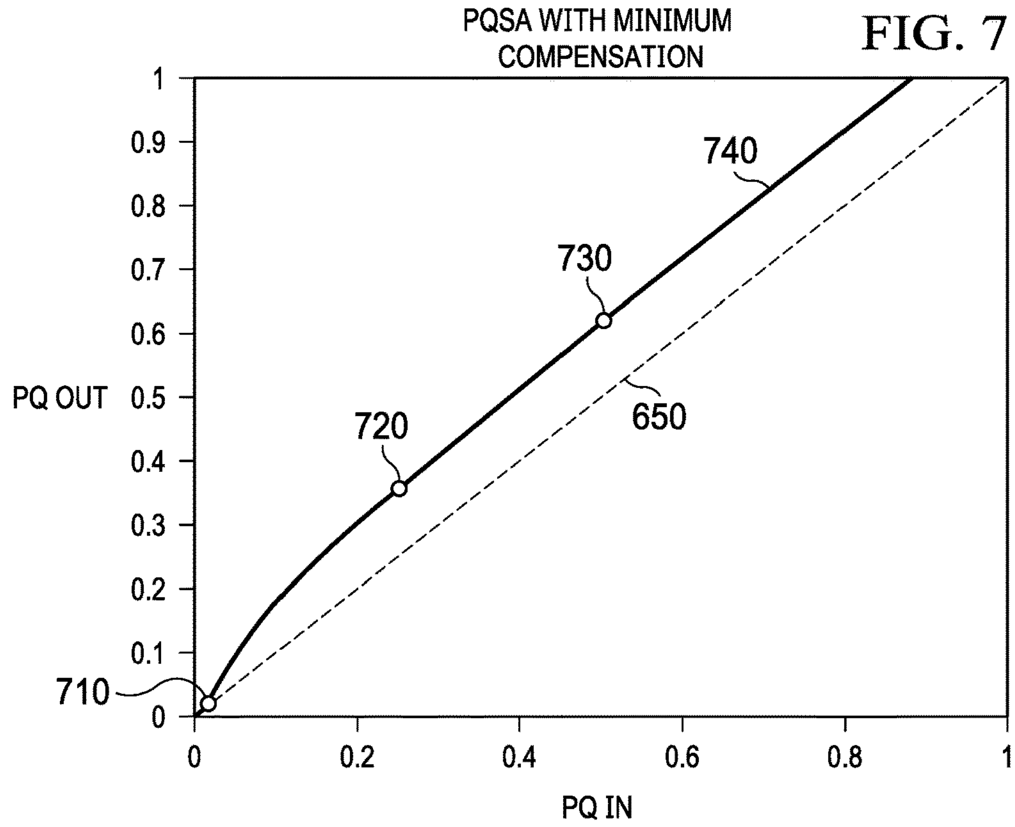
FIG. 7 illustrates an example PQ shift compensation curve adjusted to reduce brightening.

In some embodiments, this over-brightening issue can be overcome by performing an additional shift in the PQ curve. This compensation can be achieved by shifting PQ values based on the minimum pixel value of the image after tone mapping, such that contrast enhancement is maintained only where the pixels are located and the over-brightening artifact is minimized. An example of this is shown in FIG. 7, where the curve 640 from FIG. 6 has been shifted to produce a new curve 740 where the minimum point 710 is adjusted to zero compensation 650 ($PQ_{in}=PQ_{out}$) and the other values, including the midpoint 720 and maximum 730, are adjusted accordingly from that shift.

In some embodiments, an additional adjustment to the PQ compensation curve can be made to prevent banding artifacts caused by a sharp cutoff at the minimum value. An ease can be implemented by a cubic roll of input points within some small value (e.g., 36/4,096) of the minimum PQ of the image (TminPQ). The value can be found by determining experimentally what the smallest value is that reduces banding artifacts. The value can also be chosen arbitrarily, for example by visualizing the ease and determining what value provides a smooth transition to the zero compensation point.

Figure 8:
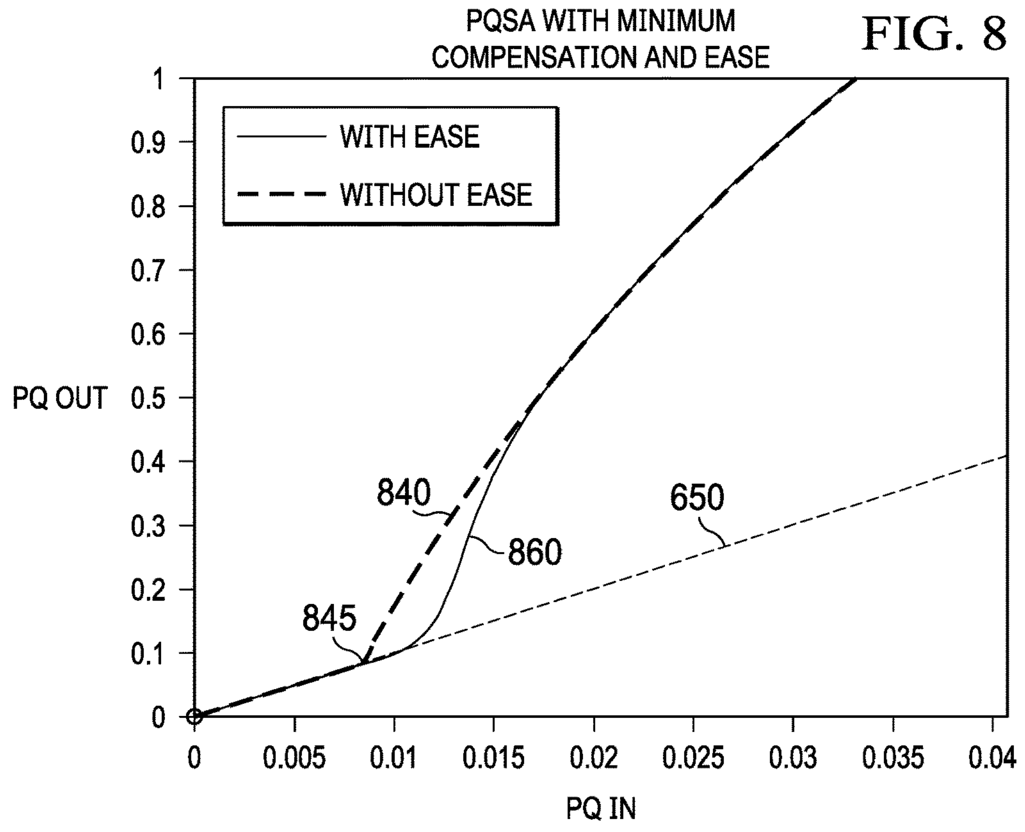
FIG. 8 illustrates an example PQ shift compensation curve with an ease added to avoid artifacts.

FIG. 8 shows an example of the use of an ease to prevent banding. The original compensation curve 840 has a sharp transition 845 at the intersection with the zero compensation line 650. An ease in-and-out is performed from the minimum PQ of the image (which is at the intersection 845 for this example, as shown for example in FIG. 7) to a point some small value incremented above the minimum PQ (e.g., TminPQ+36/4096).

The ease can be a cubic roll-off function that returns a value between 0 and 1, where 0 is returned close to the minimum PQ and 1 is returned at the incremented value. An example algorithm in (MATLAB) is as follows, where, in an embodiment and without limitation, cubicEase( ) is a monotonically increasing, sigmoid-like, function for input PQ values between TminPQ and TminPQ+36/4096, and output alpha in [0,1]:

```
PQout = L2PQ(PQ2L(PQin + C) − PQ2L(C)) [From Equation 4]
k3 = PQin >= TminPQ & PQin < TminPQ+36/4096; [Boolean index –
same index used for PQin and PQout]
alpha = cubicEase(PQin(k3), TminPQ,TminPQ+36/4096,0,1);
PQout(k3) = (1-alpha) .* PQin(k3) + alpha .* PQout(k3)
```

As used herein, the term “ease” refers to a function that applies a non-linear function to data such that a Bezier or spline transformation/interpolation is applied (the curvature of the graphed data changes). “Ease-in” refers to a transformation near the start of the data (near zero) and “ease-out” refers to a transformation near the end of the data (near the max value). “In-and-out” refers to transformations near both the start and end of the data. The specific algorithm for the transformation depends on the type of ease. There are a number of ease functions known in the art. For example, cubic in-and-out, sine in-and-out, quadratic in-and-out, and others. The ease is applied both in and out of the curve to prevent sharp transitions.

Figure 9A:
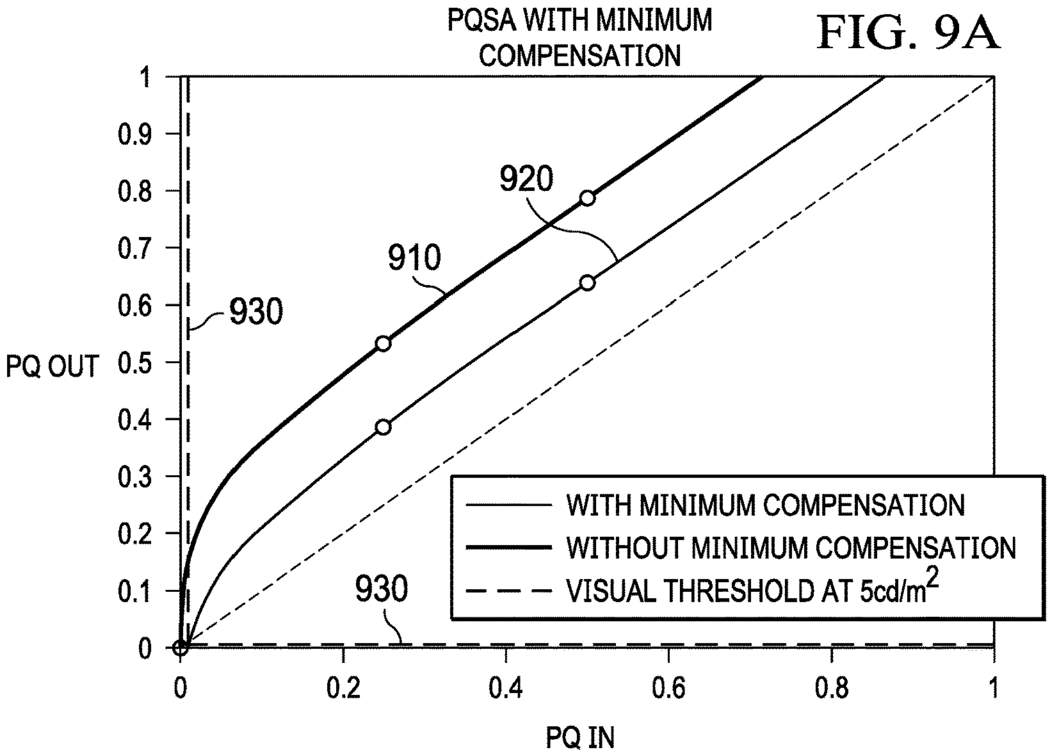
FIGS. 9A and 9B illustrate an example PQ shift compensation curve with a clamp set below a visual threshold.
Figure 9B:
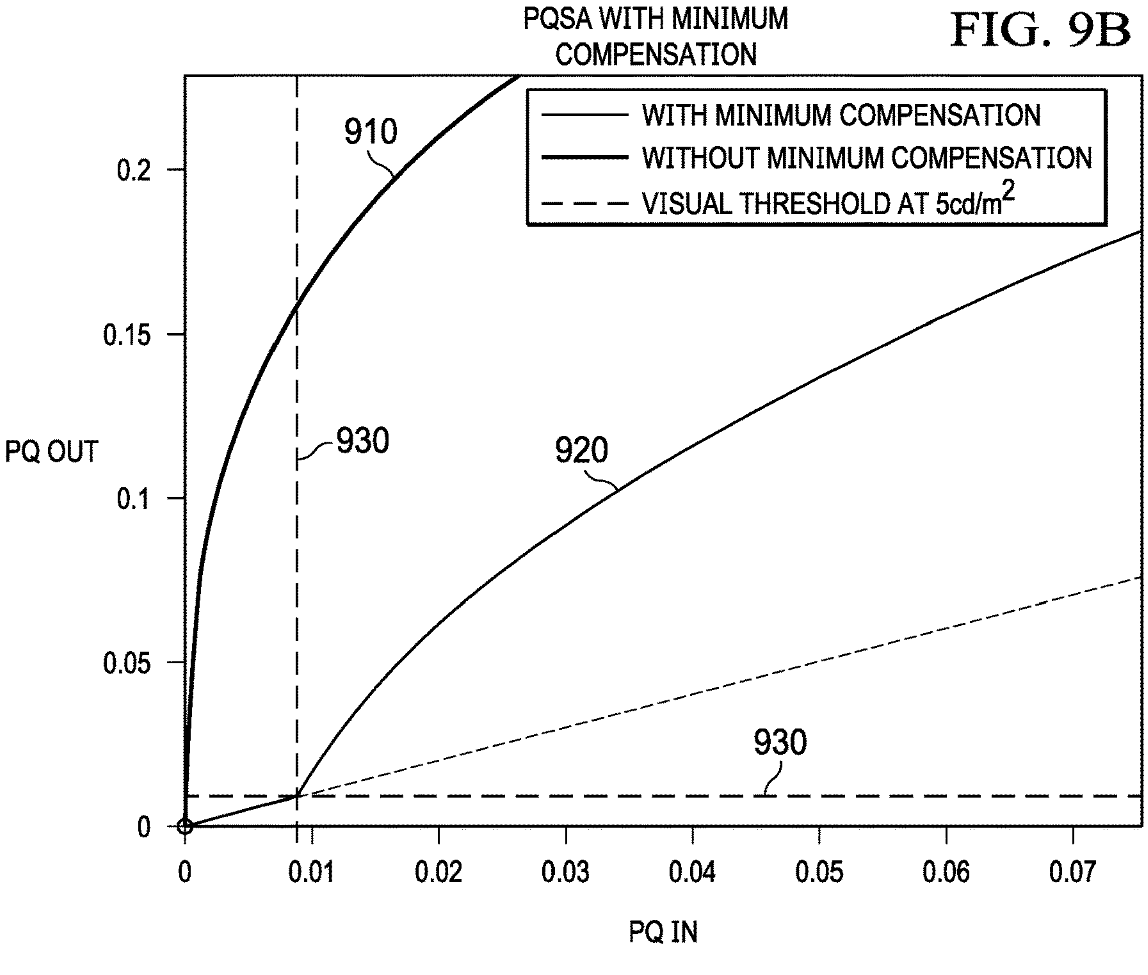

In some embodiments, the compensation can be clamped as not to be applied below a threshold PQ value in order to prevent unnecessary stretching of dark details that would not have been visible in an ideal surround lighting situation (e.g. 5 nits ambient light). The threshold PQ value can be determined experimentally by determining at what point a human viewer cannot determine details under ideal conditions (e.g. 5 nit ambient light, three picture-heights distance viewing). For these embodiments, the PQ shift (equation 4) is not applied below this threshold PQ (for $PQ_{in}$). An example of this is shown in FIGS. 9A and 9B. FIG. 9A shows a graph of PQ compensation 910 (as shown in FIG. 6) and PQ compensation with over-brightness adjustment 920 (as shown in FIG. 7) with lines showing the PQ threshold 930 below which details would not be discernable under ideal conditions. FIG. 9B shows the graph of FIG. 9A enlarged near the origin. This procedure occurs post tone mapping and can be important for displays with low black levels, such as OLED displays.

In some embodiments, the compensation can be clamped to have a maximum value, for example 0.55. This can be done with or without the threshold PQ clamping described above. Maximum value clamping can be useful for hardware implementation. The following is an example MATLAB code for showing an example algorithm for maximum value clamping at 0.55, where ambient compensation to be applied based on the target ambient surround luminance in PQ (Surr), and the source mid value of the image (L1Mid). A, B, C, D, and E are the values derived experimentally for a, b, c, d, e as shown in equations 1 and 2 above:

```
function Comp = CalcAmbientComp(Surr, L1Mid)
%Clamp source surround
Surr = max (L2PQ(5),min(1,Surr) ) ;
%Calculate compensation
offset5Nit = (A*L2PQ(5) + B) * (sqrt(L1Mid) ) . . .
   + C*L2PQ(5)^2 − D*L2PQ(5) + E;
Comp = (A*Surr + B) * (sqrt (L1Mid) ) . . .
   + C*Surr^2 − D*Surr + E − offset5Nit;
%Clamp
Comp = max (0,min(0.55,Comp) ) ;
End
```

In some embodiments, the PQ compensation curve can be simplified to be linear over a certain $PQ_{in}$ point. For example, the compensation can be calculated to be linear over PQ of 0.5 (out of a total range of [0 1]), providing an example algorithm of:

$$\text{for } PQ_{in}<0.5, PQ_{out}=L2PQ(PQ2L(PQ_{in}+C)-PQ2L(C)); \text{ and} \quad \text{eq. 6}$$

$$\text{for } PQ_{in}>0.5, PQ_{out}=PQ_{in}+C \quad \text{eq. 7}$$

This simplification over that certain PQ point is useful for hardware implementations of the method.

Figure 10:
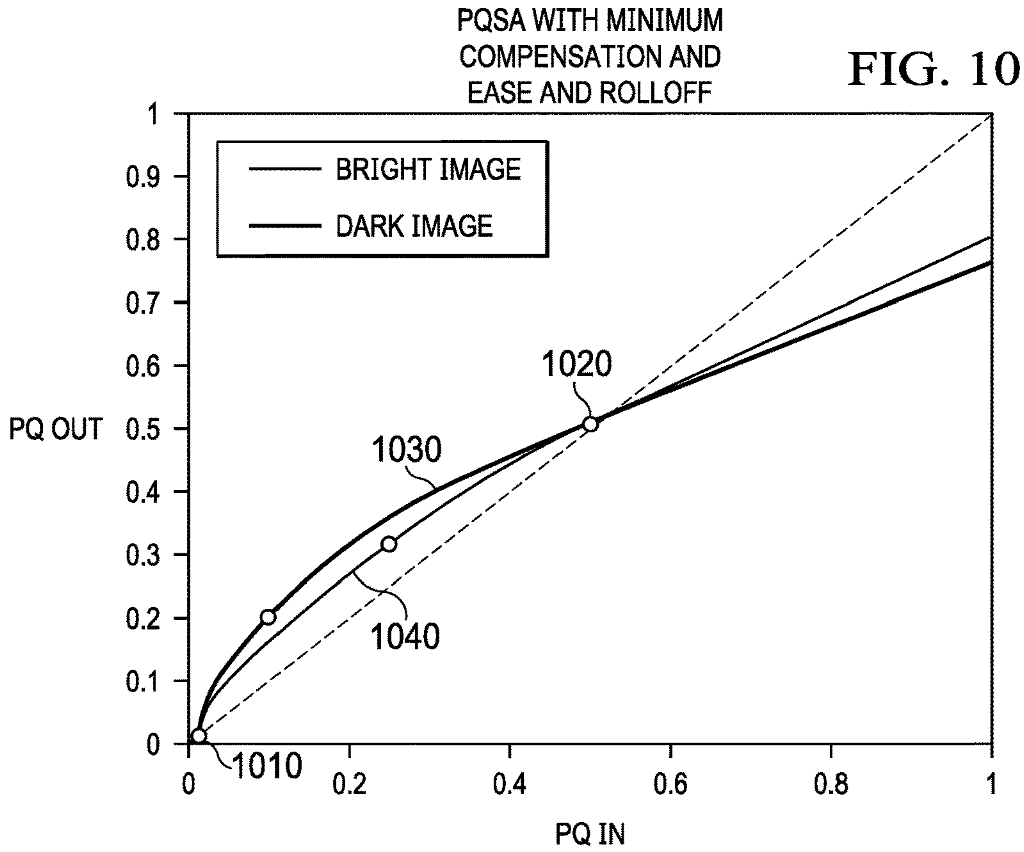
FIG. 10 illustrates an example PQ shift compensation curve with renormalization.

In some cases, the ambient light compensation might push some pixels out of the range of the target display. In some embodiments, a roll-off curve can additionally be applied to compensate for this and re-normalize the image to the correct range. This can be done by using a tone-mapping curve with the source metadata (e.g., metadata describing min, average (or middle point), and maximum luminance). Without limitation, example tone-mapping curves are described in U.S. Pat. Nos. 10,600,166 and 8,593,480, both of which are incorporated by reference herein in their entirety. Take the resulting minimum, midpoint, and maximum values of the tone mapped image (before applying ambient light compensation, e.g. equation 4), apply the ambient light compensation to those values, and then map the resulting image to the target display using a tone mapping technique. See for example U.S. Patent Application Publication No. 2019/0304379, incorporated by reference herein in its entirety. An example of the roll-off curve is shown in FIG. 10. The main features of this roll-off are that the minimum 1010 and maximum 1020 points remain within the range of the target display. The result is that brighter images 1030 will have less highlight roll-off (compromising dark/mid contrast enhancement), and darker images 1040 will have more dark detail enhancement (compromising highlight detail) due to the dynamic tone mapping characteristics of our tone curve.

In some embodiments, a further compensation can be made to compensate for reflections off the display screen. In some embodiments, the amount of light reflected off the screen may be estimated from the sensor value using the reflection characteristic of the screen as follows in equation 8.

$$\text{ReflectedLight}=\text{SensorLuminance}*\text{Screen Reflection} \quad \text{eq.8}$$

The light reflected off the screen can be treated as a linear addition of light to the image, fundamentally lifting the black level of the display. In these embodiments, tone mapping is done to a higher black level (e.g. to the level of the reflective light) where, at the end of the tone curve calculations, a subtraction is done in linear space to compensate for the added luminosity due to the reflections. See e.g. equation 9.

$$PQ_{out}=L2PQ(PQ2L(PQ_{in})-\text{ReflectedLight}) \quad \text{eq.9}$$

Figure 11:
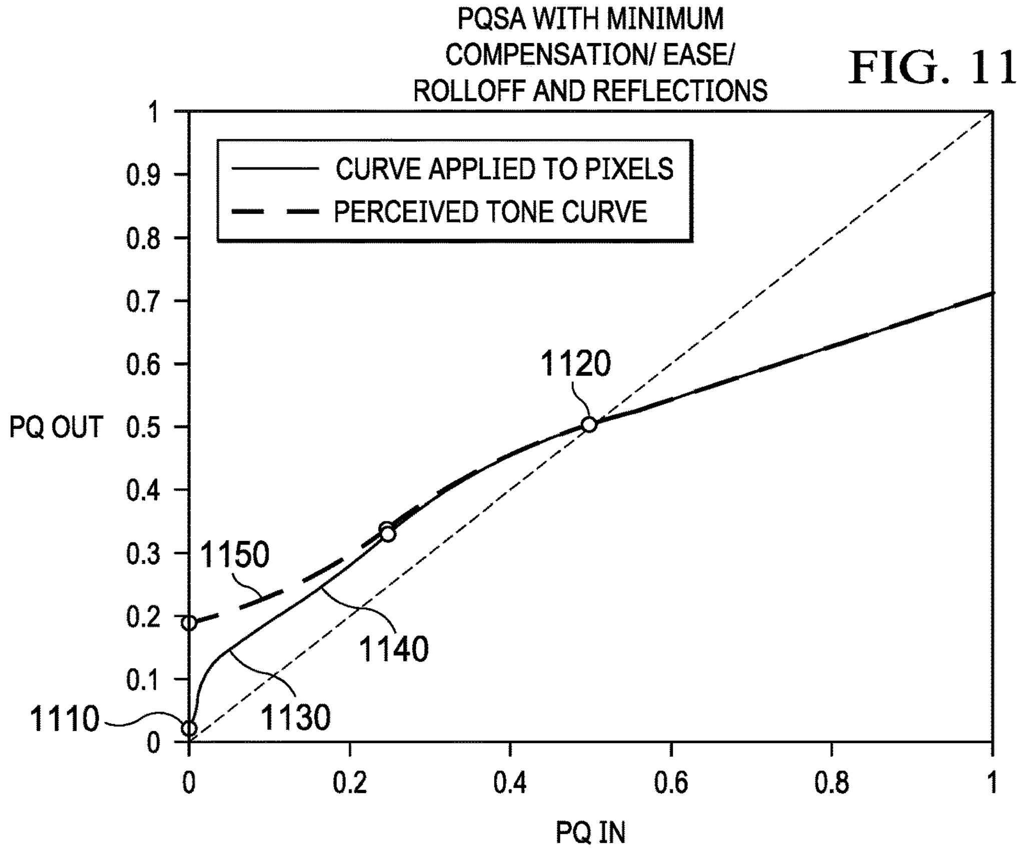
FIG. 11 illustrates an example PQ shift compensation curve adjusted for reflections.

An example of the tone curve with reflection compensation is shown in FIG. 11. The minimum 1110 and maximum 1120 levels remain as they were before reflection compensation is applied, but the contrast at the bottom end 1130 has increased substantially on the curve 1140 to be applied to the pixels. The addition of the expected reflected light produces a perceived tone curve 1150 that is closer to the desired image quality.

A number of embodiments of the disclosure have been described. Nevertheless, it will be understood that various modifications may be made without departing from the spirit and scope of the present disclosure. Accordingly, other embodiments are within the scope of the following claims.

As described herein, an embodiment of the present invention may thus relate to one or more of the example embodiments, which are enumerated below. Accordingly, the invention may be embodied in any of the forms described herein, including, but not limited to the following Enumerated Example Embodiments (EEEs) which described structure, features, and functionality of some portions of the present invention:

EEE1. A method for modifying an image to compensate for ambient light conditions around a display device, the method comprising: determining perceptual luminance amplitude quantization (PQ) data of the image; determining a PQ shift for the PQ data based on a compensation value determined from the ambient light conditions and the image, the PQ shift consisting of either: an addition to the compensation value in PQ space followed by a subtraction of the compensation value in linear space, or an addition to the compensation value in linear space followed by a subtraction of the compensation value in PQ space; applying the PQ shift to the image to modify the PQ data of the image.

EEE2. The method as recited in enumerated example embodiment 1, further comprising: applying a tone map to the image prior to applying the PQ shift.

EEE3. The method as recited in enumerated example embodiment 1 or 2, wherein: the compensation value is calculated from $C=M\sqrt{X}+B$, where C is the compensation value, M is a function of surround luminance values, X is a mid PQ value of the image, and B is a function of surround luminance values.

EEE4. The method as recited in enumerated example embodiment 3, wherein from the functions M and B are derived from experimental data derived from subjective perceptual evaluations of image PQ compensation values under different ambient light conditions.

EEE5. The method as recited in enumerated example embodiment 3 or 4, wherein M is a linear function of the surround luminance values and B is a quadratic function of the surround luminance values.

EEE6. The method as recited in any of the enumerated example embodiments 1-5, further comprising applying an additional PQ shift to the image, the additional PQ shift adjusting the image so a minimum pixel value has a compensation value of zero.

EEE7. The method as recited in any of the enumerated example embodiments 1-6, further comprising applying an ease to the PQ shift.

EEE8. The method as recited in any of the enumerated example embodiments 1-7, further comprising clamping the PQ shift so it is not applied below a threshold value.

EEE9. The method as recited in any of the enumerated example embodiments 1-8, wherein the PQ shift is calculated as a linear function above a pre-determined PQ.

EEE10. The method as recited in any of the enumerated example embodiments 1-9, further comprising applying a roll-off curve to the image.

EEE11. The method as recited in any of the enumerated example embodiments 1-10, further comprising subtracting a reflection compensation value from the PQ data in linear space at the end of tone curve calculations that provide compensation for expected screen reflections on the display device.

EEE12. The method as recited in enumerated example embodiment 11, wherein the reflection compensation value is a function of a surround luminance value of the device.

EEE13. The method as recited in any of the enumerated example embodiments 1-12, wherein the applying the PQ shift is performed in hardware or firmware.

EEE14. The method as recited in any of the enumerated example embodiments 1-12, wherein the applying the PQ shift is performed in software.

EEE15. The method as recited in any of the enumerated example embodiments 1-14, wherein the ambient light conditions are determined by a sensor in, on, or near the display device.

EEE16. A video decoder comprising hardware or software or both configured to carry out the method as recited in any of the enumerated example embodiments 1-12.

EEE17. A non-transitory computer readable medium comprising stored software instructions that, when executed by a processor, cause the method as recited in any of the enumerated example embodiments 1-12 be performed.

EEE18. A system comprising at least one processor configured to perform the method as recited in any of the enumerated example embodiments 1-12.

The present disclosure is directed to certain implementations for the purposes of describing some innovative aspects described herein, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module", a "device", an "apparatus" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

The invention claimed is:

1. A method for modifying an image to compensate for ambient light conditions around a display device, the method comprising:

determining perceptual luminance amplitude quantization (PQ) data of the image;

determining a PQ shift for the PQ data based on a compensation value determined from the ambient light conditions and the image, the PQ shift consisting of either: an addition to the compensation value in PQ space followed by a subtraction of the compensation value in linear space, or an addition to the compensation value in linear space followed by a subtraction of the compensation value in PQ space;

applying the PQ shift to the image to modify the PQ data of the image.

2. A method for modifying an image to compensate for ambient light conditions around a display device, the method comprising:

determining perceptual luminance amplitude quantization (PQ) data of the image;

determining a PQ shift for the PQ data based on a compensation value determined from the ambient light conditions and the image, wherein the compensation value is calculated from $C=M\sqrt{X}+B$, where C is the compensation value, M is a function of surround luminance values S, X is a mid PQ value of the image representing an average luminance of the image, and B is a function of surround luminance values, wherein $M=a*S+b$ and $B=c*S^2+d*S+e$, where a, b c, d and e are constants;

the PQ shift consisting of either: an addition to the compensation value in PQ space followed by a subtraction of the compensation value in linear space calculated by $PQout=L2PQ(PQ2L(PQin+C))-PQ2L(C))$ for an ambient surround luminance environment being brighter than a reference value, or an addition to the compensation value in linear space followed by a subtraction of the compensation value in PQ space calculated by PQout=L2PQ(PQ2L(PQin)+PQ2L(C))−C for an ambient surround luminance environment being darker than the reference value, wherein PQout is the resulting PQ after the shift, PQin is the original PQ value, L2PQ( ) is a function that converts from linear space to PQ space, and PQ2L( ) is a function that converts from PQ space to linear space;

applying the PQ shift to the image to modify the PQ data of the image.

3. The method of claim 1, further comprising:

applying a tone map to the image prior to applying the PQ shift.

4. The method of claim 1, wherein:

the compensation value is calculated from $C=M\sqrt{X}+B$, where C is the compensation value, M is a function of surround luminance values, X is a mid PQ value of the image, and B is a function of surround luminance values.

5. The method of claim 4, wherein from the functions M and B are derived from experimental data derived from subjective perceptual evaluations of image PQ compensation values under different ambient light conditions.

6. The method of claim 4, wherein M is a linear function of the surround luminance values and B is a quadratic function of the surround luminance values.

7. The method of claim 1, further comprising applying an additional PQ shift to the image, the additional PQ shift adjusting the image so a minimum pixel value has a compensation value of zero.

8. The method of claim 1, further comprising applying an ease to the PQ shift.

9. The method of claim 1, further comprising clamping the PQ shift so it is not applied below a threshold value.

10. The method of claim 1, wherein the PQ shift is calculated as a linear function above a pre-determined PQ.

11. The method of claim 1, further comprising applying a roll-off curve to the image.

12. The method of claim 1, further comprising subtracting a reflection compensation value from the PQ data in linear space at the end of tone curve calculations that provide compensation for expected screen reflections on the display device.

13. The method of claim 12, wherein the reflection compensation value is a function of a surround luminance value of the device.

14. The method of claim 1, wherein the applying the PQ shift is performed in hardware or firmware.

15. The method of claim 1, wherein the applying the PQ shift is performed in software.

16. The method of claim 1, wherein the ambient light conditions are determined by a sensor in, on, or near the display device.

17. A video decoder comprising hardware or software or both configured to carry out the method as recited in claim 1.

18. A non-transitory computer readable medium comprising stored software instructions that, when executed by a processor, perform the method of claim 1.

19. A system comprising at least one processor configured to perform the method as recited in claim 1.

* * * * *